No. 675,321.　　　　　　　　　　　　　　　Patented May 28, 1901.
H. BROWNFIELD.
FISH HOOK.
(Application filed Sept. 28, 1900.)
(No Model.)
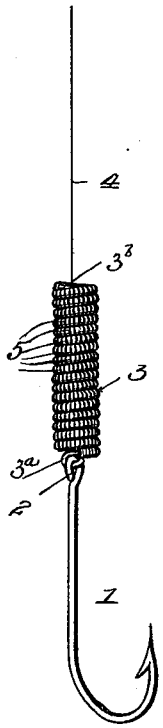
Witnesses:
Harry S. Rohrer
Herbert D. Lawson
Inventor:
Horace Brownfield
By Victor J. Evans. Attorney

UNITED STATES PATENT OFFICE.

HORACE BROWNFIELD, OF PASTORIA, ARKANSAS.

FISH-HOOK.

SPECIFICATION forming part of Letters Patent No. 675,321, dated May 28, 1901.

Application filed September 28, 1900. Serial No. 31,406. (No model.)

*To all whom it may concern:*

Be it known that I, HORACE BROWNFIELD, a citizen of the United States, residing at Pastoria, in the county of Jefferson and State of Arkansas, have invented new and useful Improvements in Fish-Hooks, of which the following is a specification.

This invention relates to new and useful improvements in fish-hooks; and its primary object is to provide a device of this character which will prevent sudden strains upon the line, which will serve as a bait to attract the fish by simulating a worm having ring markings thereon, and which will prevent biting or cutting of a line.

With these and other objects in view the invention consists in providing a hook of ordinary construction having a coiled spring secured at opposite ends to said hook and to the line and a small wire thread closely wound around the coils of the coiled spring.

The invention also consists in the further novel construction and combination of parts hereinafter more fully described and claimed, and illustrated in the accompanying drawing, showing the preferred form of my invention, and which is a detailed view of the device.

Referring to the figure by numerals of reference, 1 is a hook of ordinary construction having a loop 2, which engages a loop $3^a$ on one end of a coil-spring 3. The opposite end $3^b$ of this spring is fastened in any suitable manner to the line 4. The coil-spring 3 is preferably formed of any bright material, such as brass, and the wire thereof is bound with a small wire thread 5, which gives the same the appearance of a worm.

It is obvious that when any sudden strain is placed upon the hook 1 the spring 3 will ease the pressure upon the line 4. Said spring will also serve as a bait to attract the fish and will, moreover, prevent cutting the line after the hook has been swallowed.

It is of course understood that bait may be used in connection with this device if desired.

In the foregoing description I have shown the preferred form of my invention, but I do not limit myself thereto, as I am aware that modifications may be made therein without departing from the spirit or sacrificing the advantages thereof, and I therefore reserve the right to make all such changes as fairly fall within the scope of my invention.

Having thus fully described my invention, what I claim as new, and desire to secure by Letters Patent, is—

A fish-hook comprising a coiled spring and a small thread of wire closely wound around the coiled spring.

In testimony whereof I affix my signature in presence of two witnesses.

HORACE BROWNFIELD.

Witnesses:
N. T. WHITE,
E. L. MCGILLIE.